United States Patent Office 3,366,053
Patented Jan. 30, 1968

3,366,053
AMMONIUM NITRATE EXPLOSIVE MIXTURE
George L. Griffith, Coopersburg, George A. Lyte, Bethlehem, and Franklin B. Wells, Emmaus, Pa., assignors to Trojan Powder Company, a corporation of New York
No Drawing. Filed Oct. 29, 1958, Ser. No. 770,302
3 Claims. (Cl. 102—24)

This invention relates to an ammonium nitrate-based explosive mixture which includes not over about 4% aluminum in finely-divided form and which is sensitized by a small amount of water.

Ammonium nitrate-based explosives constitute an important proportion of the sales volume of explosive mixtures. Ammonium nitrate explosives are generally characterized by a low sensitiviey to detonation, and hence it is customary to combine with the ammonium nitrate an ingredient which sensitizes the explosive. For this purpose materials can be used which are themselves detonatable, but many desirable materials which are employed are not themselves detonatable, and nonetheless sensitize the ammonium nitrate.

The ability of a substance to act as a sensitizer is in no way related to its own sensitivity to detonation, but is based upon unknown and unpredictable factors. A surprising variety of materials are effective sensitizers. Detonatable sensitizers include nitroglycerin and nitrostarch, and among the effective nondetonatable sensitizers are inorganic materials, such as particulate metals and particularly flake and powdered aluminum.

Certain substances have a desensitizing effect on ammonium nitrate-based explosives. For example, water has been known to be a desensitizer. It also causes setting, and usually has been considered undesirable.

In accordance with the instant invention, it has been determined that an amout of water within the range from 1 to 6% and preferably from 1.25 to 5% will considerably increase the sensitivity to detonation of explosive mixtures based on ammonium nitrate as the principal explosive component and containing not over 4% aluminum. This increased sensitivity is evidenced in detonation by a much less powerful blasting cap. The fact that sensitivity is increased by water in this instance is particularly surprising, in view of the previous experience in the art that water is a desensitizer for such explosives.

Undoubtedly, the increased sensitivity is closely correlated with the proportions of the three essential ingredients, the ammonium nitrate, aluminum and water, which have been found to be critical in obtaining the result. Less than 1% water has been found to have little or no sensitizing action. An increase in the amount of water beyond 6% with the aluminum not over 4% as stated also results in loss of the sensitizing effect. However, the use of water in the small amounts called for by the invention which is simply admixed with the other ingredients under normal atmospheric conditions as herein described does not cause setting of the mixture in any way, nor is the mixture hardened to an appreciable extent. Cartridges of the mixture may easily be penetrated by the priming awl.

It may be noted that in the past water has under special circumstances been added to explosives containing ammonium nitrate but in such case the water was used to cause the ammonium nitrate to go into solution either by having a large amount of water present or by heating the mixture which increases the amount of ammonium nitrate that can be dissolved by a given amount of water. Subsequently either excess water was dried out or the mass was cooled and this causes part of the ammonium nitrate to go out of solution with the formation of new crystals. It is a recognized fact that such newly formed crystals cement together the original crystals of the mixture and form the mass into a compacted solidified whole. This is illustrated for example in Woodbury et al. Patent No. 2,603,572.

The water must be free water. Water in hydrated or other bound form is ineffective. Apparently, the increase in sensitivity is due to some action of free water on one or more of the components present and not to some effect during the detonation, under which conditions the hydrated water ought to be liberated and then made available as free water.

This increased sensitivity is obtained with mixtures containing additional explosive components both of the detonating and nondetonating type. Of the detonating components which can be used nitrostarch is preferred. Also useful are nitroglycerin, a mixture of 60% cyclotrimethylenetrinitramine, 40% trinitrotoluene and from 1 to 4% paraffin wax, trinitrotoluene and other nitrotoluenes, nitronaphthalenes, pentaerythritol tetranitrate, a mixture of 1:1 pentaerythritol tetranitrite and trinitrotoluene and cyclotrimethylenetrinitramine. These would usually be used in amounts ranging from 0 to about 12%, preferably from 7 to 12%.

The mixture of 60% cyclotrimethylenetrinitramine, 40% trinitrotoluene and from 1 to 4% paraffin wax is commonly called in the trade "composition B," and for the purpose of simplicity we use such name as indicating that composition. In the same way, the mixture of 1:1 pentaerythritol tetranitrite and trinitrotoluene is commonly known in the trade as "pentolite" and again we use the term "pentolite" as defining such material. Likewise the cyclotrimethylenetrinitramine is commonly known as "cyclonite" and again we use that term as defining the materials specified.

There can also be included materials consisting largely of carbon such as coal, charcoal, carbon black, lamp black, bagasse, nut and wood flours and meals and starch. These would be used in an amount within the range from 0 to about 7%, preferably from 5 to 7%.

Rosin and metallic resinates, hexamethylene tetramine and paraffin oils and waxes such as mineral oil also can be included in small amounts, usually not in excess of 0.4%.

Stabilizers such as calcium carbonate, magnesium oxide and like inorganic salts, which are well known to those skilled in the art, can also be incorporated. Such materials would usually be used in an amount up to about 0.5%.

The invention is applicable not only to ammonium nitrate but also to mixtures thereof with alkali metal nitrates such as sodium nitrate and potassium nitrate. In such mixtures the ammonium nitrate would be present in major proportion, of the order of 75% to 95%, and the alkali metal nitrate in the proportion from 5 to 25%.

The particle size of the nitrate can be adjusted to meet the need. Ordinary commercial mill ammonium nitrate is perfectly satisfactory. In some cases, coarse nitrate having a grain size passing a standard No. 6 sieve and held on a standard No. 10 sieve is desirable.

The mixture is readily prepared by dry mixing the ingredients. The water is itself absorbed in or on the solid particles of the mixture during mixing.

The following examples in the opinion of the inventors represent the best embodiments of their invention.

Example 1

Commercial mill ammonium nitrate (98 parts) was intimately mixed with 2 parts of powdered aluminum and tested by loading in to 1" x 4" cartridges to a density of 0.98 and detonating. The mixture was completely detonated with a standard No. 8 blasting cap, but not with a No. 6 blasting cap.

A second mixture was prepared using the same proportions with the addition of 1% water to the mixture. The material detonated with a No. 2 blasting cap, showing that it had been sensitized to a remarkable degree by simple addition of the water. A similar mixture containing 97 parts mill ammonium nitrate, 2 parts aluminum, 1 part oil and 1 part water also detonated with a No. 2 cap.

A third mixture was prepared containing 96 parts of commercial mill ammonium nitrate and 4 parts of powdered aluminum. This material was loaded to a density of 1.00, and found to be sensitive to a No. 6 cap. A fourth mixture made exactly as the third but containing 1.25% water was sensitive to a No. 1½ blasting cap.

A fifth mixture prepared from 98.5 parts commercial mill ammonium nitrate and 1.5 parts powdered aluminum and loaded to a density of 0.99 was found to be sensitive to a No. 14 cap. The same mixture containing 1 part water was sensitive to a No. 4 cap.

In all cases, the increase in sensitivity due to the water was outstanding.

Example 2

Two formulations were prepared based on ammonium nitrate and nitrostarch as the detonating sensitizer. These mixtures were practically identical, save for the presence of water, and were as follows:

|  | A | B |
|---|---|---|
| Mill Ammonium Nitrate | 82.72 | 81.89 |
| Aluminum Powder | 1.77 | 1.75 |
| Nitrostarch | 9.19 | 9.10 |
| Calcium Carbonate | 0.10 | 0.10 |
| Powdered Anthracite Coal | 6.21 | 6.15 |
| Carbon Black | 0.01 | 0.01 |
| Water | | 1.00 |
|  | 100.00 | 100.00 |
| Loading Density | 0.98–1.00 | 1.00–1.02 |

The mixture containing water was negligibly denser than the mixture which did not. It was sensitive to a No. 1 blasting cap, whereas the dry mixture required a No. 2½ cap. Thus, this small amount of water greatly increased sensitivity.

Example 3

This example illustrates the use of mixed nitrates, and a somewhat higher proportion of water:

|  | C | D |
|---|---|---|
| Ammonium Nitrate-Sodium Nitrate 5:1 | 82.59 | 80.69 |
| Aluminum Powder | 2.05 | 2.00 |
| Nitrostarch | 7.88 | 7.70 |
| Magnesium Oxide | 0.10 | 0.10 |
| Wood Flour | 7.37 | 7.20 |
| Carbon Black | 0.01 | 0.01 |
| Water | | 2.30 |
|  | 100.00 | 100.00 |
| Loading Density | 1.055 | 1.19 |

The loading densities of these mixtures were not significantly different. The water-containing mixture was sensitive to a No. 8 blasting cap, whereas the dry mixture required a No. 10 cap, showing the increase in sensitivity due to the water.

Example 4

This example shows that the water which is present must be free water. Hydrated water or bound water is not effective.

|  | E | F | G |
|---|---|---|---|
| Ammonium Nitrate-Sodium Nitrate 5:1 | 53.44 | 51.04 | 51.04 |
| Ammonium Nitrate passing a Standard No. 10 sieve | 26.15 | 25.00 | 25.00 |
| Aluminum Powder | 1.57 | 1.50 | 1.50 |
| Nitrostarch | 12.09 | 11.55 | 11.55 |
| Calcium Carbonate | 0.20 | 0.20 | 0.20 |
| Wood Flour | 6.54 | 6.25 | 6.25 |
| Carbon Black | 0.01 | 0.01 | 0.01 |
| Water | | 4.45 | |
| Borax (Sodium tetraborate decahydrate) | | | [1] 9.6 |
|  | 100.00 | 100.00 | [2] 105.15 |
| Loading Density | 1.08–1.10 | 1.48–1.52 | 1.16 |

[1] 4.5% Bound H₂O.
[2] Parts.

The water-containing mixture was sensitive to a No. 8 blasting cap, whereas the dry mixture required a No. 10 blasting cap. Again, the water considerably increased the sensitivity.

The Mixture G, containing water in bound form as the hydrate of sodium tetraborate, was slightly more dense than Mixture E, but this difference was not sufficiently great to cause any problem in use. However, this material was even less sensitive than the dry mixture and required a No. 16 blasting cap. This mixture contained bound water equivalent to 4.45% water if available, and this shows therefore that the water must be free before detonation can be affected. Bound water is useless, even though this water would be expected to be liberated at an elevated temperature.

Example 5

The formulations E and F of Example 4 were prepared in the same way, except that ground Pentolite was substituted for nitrostarch. The dry mixtures were sensitive to a No. 10 blasting cap, whereas the wet mixtures were sensitive to a No. 8 blasting cap.

The densities of the mixtures with and without water were comparable to those of Example 4E and F.

Example 6

The formulations E and F of Example 4 were prepared in the same way, except that Composition B was substituted for nitrostarch. The dry mixtures were sensitive to a No. 10 blasting cap, whereas the wet mixtures were sensitive to a No. 8.

Example 7

The formulations of E and F of Example 4 were prepared in the same way except that the nitrostarch was replaced by the same weight of dry trinitrotoluene. The dry TNT mixture was sensitive to a No. 10 blasting cap, whereas the moist mixture gave almost complete detonation with a No. 8 blasting cap and was easily detonated with a No. 10 cap.

Example 8

The formulations of E and F of Example 4 were prepared in the same way except that the nitrostarch was replaced by the same weight of Cyclonite (RDX). The dry RDX mixture detonated fully with a No. 10 cap and almost completely with a No. 8 cap. The RDX mixture which was moistened with the 4.45% water was sensitive to a No. 7 cap.

Example 9

The following example illustrates the different effects obtained with varying amounts of water.

|  | H | I | J | K | L |
|---|---|---|---|---|---|
| Ammonium Nitrate-Sodium Nitrate 5:1 | 51.86 | 49.54 | 48.99 | 47.99 | 47.49 |
| Ammonium Nitrate passing a Standard No. 10 sieve | 26.16 | 25.00 | 25.00 | 25.00 | 25.00 |
| Aluminum Powder | 3.14 | 3.00 | 3.00 | 3.00 | 3.00 |
| Nitrostarch | 12.09 | 11.55 | 11.55 | 11.55 | 11.55 |
| Calcium Carbonate | 0.20 | 0.20 | 0.20 | 0.20 | 0.20 |
| Wood Flour | 6.54 | 6.25 | 6.25 | 6.25 | 6.25 |
| Carbon Black | 0.01 | 0.01 | 0.01 | 0.01 | 0.01 |
| Water |  | 4.45 | 5.0 | 6.0 | 6.5 |
|  | 100.00 | 100.00 | 100.00 | 100.00 | 100.00 |
| Loading Density | 1.08–1.10 | 1.48–1.52 | 1.48–1.52 | 1.48–1.52 | 1.48–1.52 |
| Cap Sensitivity | 8 | 4 | 4 | 6 |  |

It is apparent from I that the addition of 4.45% water greatly increased the sensitivity of the mixture. The sensitivity continued high as the amount of water added increased to 5% but then began to decrease, was much less at 6% and when 6.5% water was used the mixture became useless, due to caking.

Example 10

|  | E | F | M | N |
|---|---|---|---|---|
| Ammonium Nitrate-Sodium Nitrate 5:1 | 53.44 | 51.04 | 55.01 | 52.54 |
| Ammonium Nitrate passing a Standard No. 10 sieve | 26.15 | 25.00 | 26.15 | 25.00 |
| Aluminum Powder | 1.57 | 1.50 |  |  |
| Nitrostarch | 12.09 | 11.55 | 12.09 | 11.55 |
| Magnesium Oxide | 0.20 | 0.20 | 0.20 | 0.20 |
| Wood Flour | 6.54 | 6.25 | 6.54 | 6.25 |
| Carbon Black | 0.01 | 0.01 | 0.01 | 0.01 |
| Water |  | 4.45 |  | 4.45 |
|  | 100.00 | 100.00 | 100.00 | 100.00 |
| Loading Density | 1.08–1.10 | 1.48–1.52 | 1.08–1.10 | 1.48–1.52 |
| Cap Sensitivity | 10 | 8 | (¹) | (¹) |

¹ Both failed with No. 16 caps, and with 6 g. PETN boosters.

M and N are included for comparison with aluminum containing mixtures. M and N are each of the same order of sensitivity and each is much less sensitive than either E or F. If the 6 gram pentaerythritol tetranitrate cap were included in the standard cap scale, it would be equivalent to at least a No. 50 cap.

Example 11

A mixture was prepared in the same way as in Example 4E, except that it was packed to a density of 1.385 in 1¼" x 4" cartridges. The standard 1" x 4" cartridge was not used because it was too small to allow for the larger booster required. At this high density, complete detonation was not obtained even when 6 grams of pentaerythritol tetranitrate was used as a booster. Thus, it is seen that the dry mixture even at a density of 1.385 is very much less sensitive than the moist mixture at densities in the neighborhood of 1.50.

In contrast, a sample prepared as in Example 4F using loading by gentle bumping to obtain a powder density of 1.10–1.15 was sensitive to a No. 4 cap.

Example 12

A mixture was prepared in Example 9I loading the cartridge by gentle bumping to obtain a powder density of approximately 1.12. Under these conditions the material was sensitive to a No. 2 cap and detonated almost completely with a No. 1½ cap.

All proportions of aluminum, water and ammonium or other alkali metal nitrate are by weight of these three ingredients. Proportions of optional components are by weight of the entire mixture.

We claim:

1. An explosive cartridge characterized by its high sensitivity to detonation containing a granular explosive mixture consisting essentially of ammonium nitrate as the principal explosive component and including from about 1% to 6% of water and from about 1% to 4% of finely divided aluminum, such mixture being in substantially unset and uncaked form and in which the explosive mixture comprises from 7% to 12% of additional explosive components selected from the group consisting of nitrostarch, nitroglycerine, pentolite, cyclonite and trinitrotoluene.

2. A cartridge as specified in claim 1 in which the mixture comprises from 5% to 7% of carbonaceous material selected from the group consisting of coal, charcoal, carbon black, wood flour and starch.

3. An explosive cartridge characterized by its high sensitivity to detonation containing a granular explosive mixture consisting essentially of ammonium nitrate as the principal explosive component and including from about 1% to 6% of water and from about 1% to 4% of finely divided aluminum, such mixture being in substantially unset and uncaked form and in which the explosive mixture includes from 7 to 12% of an explosive nitrated organic sensitizer as an additional explosive component.

References Cited

UNITED STATES PATENTS

| 2,063,572 | 12/1936 | Woodbury et al. | 52—5 |
| 2,836,484 | 5/1958 | Streng et al. | 52—15 |
| 2,860,041 | 11/1958 | Griffith et al. | 52—14 |
| 2,867,172 | 1/1959 | Hradel | 52—14 |
| 2,463,709 | 3/1949 | McFarland | 52—14 |

BENJAMIN R. PADGETT, *Primary Examiner.*

LEON D. ROSDOL, OSCAR R. VERTIZ, ROGER L. CAMPBELL, CARL D. QUARFORTH, *Examiners.*

A. D. AKERS, *Assistant Examiner.*